(12) United States Patent
Reamsnyder et al.

(10) Patent No.: US 7,799,219 B2
(45) Date of Patent: Sep. 21, 2010

(54) FILTER AND METHOD OF MAKING

(75) Inventors: Christopher R. Reamsnyder, Perrysburg, OH (US); Craig E. Bishop, Waterville, OH (US)

(73) Assignee: Honeywell International Inc., Morristown, NJ (US)

( * ) Notice: Subject to any disclaimer, the term of this patent is extended or adjusted under 35 U.S.C. 154(b) by 472 days.

(21) Appl. No.: 11/845,043

(22) Filed: Aug. 25, 2007

(65) Prior Publication Data

US 2008/0047900 A1 Feb. 28, 2008

Related U.S. Application Data

(60) Provisional application No. 60/840,524, filed on Aug. 28, 2006, provisional application No. 60/840,365, filed on Aug. 25, 2006.

(51) Int. Cl.
*B01D 35/30* (2006.01)
*B01D 27/00* (2006.01)
*B01D 35/00* (2006.01)
*B01D 35/02* (2006.01)
*B01D 35/28* (2006.01)

(52) U.S. Cl. .................. 210/248; 210/232; 210/313; 210/429; 210/433.1; 210/435; 210/438; 210/439; 210/440; 210/443; 210/444

(58) Field of Classification Search .............. 210/341, 210/248, 438, 439, 443, 232, 429, 440, 444, 210/435, 313, 433.1
See application file for complete search history.

(56) References Cited

U.S. PATENT DOCUMENTS 2,886,180 A    5/1959  Morgan et al.
3,883,428 A *  5/1975  Waring ................. 210/94
4,192,750 A *  3/1980  Elfes et al. ............ 210/133
4,592,836 A    6/1986  Chiao
5,902,479 A *  5/1999  Fukumori et al. ...... 210/248

(Continued)

FOREIGN PATENT DOCUMENTS

EP    0839563    6/1998

(Continued)

OTHER PUBLICATIONS

International Search Report Dated Feb. 12, 2008, International Application No. PCT/US2007/076832.
Written Opinion of International Searching Authority Dated Feb. 12, 2008, International Application No. PCT/US2007/076832.

*Primary Examiner*—Krishnan S Menon
*Assistant Examiner*—Benjamin Kurtz
(74) *Attorney, Agent, or Firm*—Cantor Colburn LLP

(57) ABSTRACT

A filter, comprising: a housing defining an inner cavity; an inner sleeve disposed within the housing, the inner sleeve having portions in a spaced relationship with respect to the an interior surface of the inner cavity; a plurality of tab members extending away from the inner sleeve, the tab members being configured to be removably secured to a feature of a cap, the cap being configured to engage the housing to provide a first position and a second position with respect to the housing, wherein the first position seals the inner sleeve to the housing and a fluid filtration path from an inlet of the filter to an outlet of the filter is defined by the inner sleeve and the second position provides a fluid drain path through an opening in the cap, the fluid drain path being closed when the cap is in the first position; and a filtration media disposed within an interior area of the inner sleeve, wherein the filtration media is disposed in the fluid filtration path and fluid flow through the outlet opening must pass through the filtration media.

18 Claims, 5 Drawing Sheets

U.S. PATENT DOCUMENTS

| | | | | |
|---|---|---|---|---|
| 6,139,741 A * | 10/2000 | McGibbon | ............... | 210/323.1 |
| 6,485,637 B2 * | 11/2002 | Jainek et al. | ................ | 210/130 |
| 6,644,624 B2 * | 11/2003 | Jainek | .................... | 251/149.6 |
| 6,740,235 B2 * | 5/2004 | Gill | ........................... | 210/238 |
| 2002/0066697 A1 * | 6/2002 | Ochi et al. | ................. | 210/444 |

FOREIGN PATENT DOCUMENTS

| | | |
|---|---|---|
| EP | 1110590 | 6/2001 |
| EP | 1419809 | 5/2004 |
| FR | 2801929 | 6/2001 |
| WO | WO 2006052530 | 5/2006 |

* cited by examiner

FILTER AND METHOD OF MAKING

CROSS REFERENCE TO RELATED APPLICATIONS

This application claims the benefit of U.S. Provisional Patent Application Ser. No. 60/840,365 filed Aug. 25, 2006 and U.S. Provisional Patent Application Ser. No. 60/840,524 filed Aug. 28, 2006 the contents each of which are incorporated herein by reference thereto.

BACKGROUND

Exemplary embodiments of the present invention relate to a filter for a fluid and a method for making the same.

Liquid filters are provided to remove contaminants from a fluid being circulated through a flow path. Non-limiting examples, include oil, fuel and coolant filters, wherein the filter is configured to have a flow path therethrough, wherein the filter has an inlet opening or openings and an outlet opening with filtration media disposed therein.

In general a filter comprises a housing for the filtration media as well as a means for defining the flow path wherein fluid to be filtered enters into the filter passes through the filter media and then the filtered fluid exits out through an outlet opening. As may be expected, a filter may comprise multiple components to ensure the fluid being filtered passes through the media and out through the outlet opening.

In many cases, a filtration housing that holds the fluid and the required filtration cartridge is mounted in a position whereby, prior fluid drainage of the housing is required prior to the removal of the filter cartridge for replacement. In all known instances, draining is achieved by removing a plug or activating a drain device (e.g., a valve). Thereafter, and once the housing is drained the cartridge can be removed and replaced. Unfortunately, doing so requires additional components and presents the potential for the drain not being fully closed prior to filling the housing pack up with fluid. Additionally, and in many cases, the drain plugs are lost or damaged causing additional issues for the user.

Accordingly, it is desirable to provide a filter and method of manufacture wherein the filter or filter housing is capable of being drained in an easy manner providing an improved means for removing and replacing the filter cartridge. In addition, it is also desirable to provide a cartridge for such uses.

SUMMARY OF THE INVENTION

In accordance with an exemplary embodiment of the present invention, features of the housing, housing cap and filter cartridge work in conjunction with one another to create: a drain in one position; a closed assembly in another position; and a means for removing and replacing the cartridge in still another position. Exemplary embodiments eliminate the need for extra drain components while ensuring a closed assembly upon proper installation of the filter cartridge.

A filter and method of making is provided. Exemplary embodiments are directed to a filter, comprising: a housing defining an inner cavity; an inner sleeve disposed within the housing, the inner sleeve having portions in a spaced relationship with respect to the an interior surface of the inner cavity; a plurality of tab members extending away from the inner sleeve, the tab members being configured to be removably secured to a feature of a cap, the cap being configured to engage the housing to provide a first position and a second position with respect to the housing, wherein the first position seals the inner sleeve to the housing and a fluid filtration path from an inlet of the filter to an outlet of the filter is defined by the inner sleeve and the second position provides a fluid drain path through an opening in the cap, the fluid drain path being closed when the cap is in the first position; and a filtration media disposed within an interior area of the inner sleeve, wherein the filtration media is disposed in the fluid filtration path and fluid flow through the outlet opening must pass through the filtration media.

In another exemplary embodiment a filter is provided, the filter comprising: a housing defining a plurality of inner cavities; a separate inner sleeve disposed each of the inner cavities, each inner sleeve having portions in a spaced relationship with respect to the an interior surface of the inner cavity; a plurality of tab members extending away from each inner sleeve, the tab members being configured to be removably secured to a feature of a separate cap for each inner sleeve, each cap being configured to be located in two discrete positions with respect to the housing to provide a first position and a second position, wherein the first position of each cap seals a respective inner sleeve to the housing and a fluid filtration path from an inlet of the filter to an outlet of the filter is defined by the inner sleeve and the second position of each cap provides a fluid drain path through an opening in the cap, the fluid drain path being closed when the cap is in the first position; and a filtration media disposed within an interior area of each inner sleeve, wherein the filtration media is disposed in the fluid filtration path and fluid flow through the outlet opening must pass through the filtration media.

In another exemplary embodiment a method for providing a drain path though a filter housing is provided, the method comprising: moving a cap from a first position to a second position with respect to the filter housing wherein an opening in the cap is unsealed as the cap moves from the first position to the second position, the cap becoming unsealed to provide the drain path therethrough as a head member is removed from an opening in the cap, the head member being secured to a filtration media disposed in the filter housing, the filtration media being disposed in an inner sleeve also disposed in the housing, the inner sleeve having a plurality of tab members extending away from the inner sleeve, the tab members being configured to be removably secured to a feature of the cap and the first position of the cap seals the inner sleeve to the filter housing and a fluid filtration path from an inlet of the filter housing to an outlet of the filter housing is defined by the inner sleeve, the fluid drain path being closed when the cap is in the first position.

The above-described and other features are appreciated and understood by those skilled in the art from the following detailed description, drawings, and appended claims.

DETAILED DESCRIPTION OF EXEMPLARY EMBODIMENTS

Figure 1:
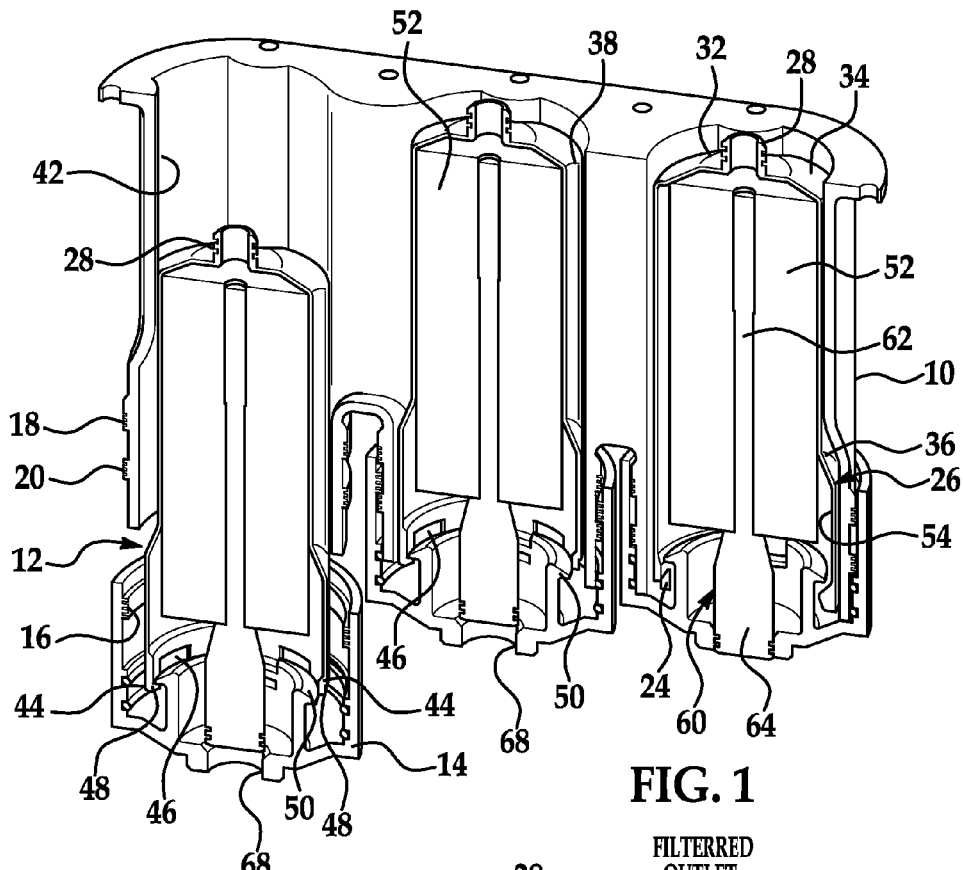
FIG. 1 illustrates a perspective cross-sectional view of an exemplary embodiment of the present invention.

In accordance with exemplary embodiments of the present invention, a filter and method of using/replacing the filter is disclosed. In an exemplary embodiment the filter will comprise a cap configured to engage features of a housing to provide one of three operational positions, wherein the cap is positionable in a closed position, a drain position; and a removal position. In addition, the cap is also configured to removably engage a filter cartridge. The filter cartridge is configured to filter fluids passing therethrough as well as being configured to be removably secured to the cap.

The attached drawings show how the housing, housing cap and the filter cartridge interact with one another to achieve the desired assembly. The materials used in the filter and filter cartridge can be various in nature. Likewise, the cap may be attached in any suitable means, non-limiting examples include a plurality of threads, a cam lock or a combination of the both. In accordance with an exemplary embodiment, there are three positions that the cap can be positioned into 1) fully tightened, which is the operational mode; 2) one set of two threads engaged or between the two sets of threads, which is draining mode; and 3) no threads engaged, which allows for the removal of the cartridge assembly.

As shown in FIGS. 1-10, a housing 10 is configured to receive a plurality of filter cartridges 12, which are configured to removably engage features of a cap 14. In accordance with an exemplary embodiment cap 14 has a plurality of threads 16 configured to threadingly engage threads 18 and 20 positioned on a portion of housing 10. As shown in the attached Figures, cap 14 has features configured to engage tab members or features of an inner sleeve 26. In accordance with an exemplary embodiment, inner sleeve 26 is configured to receive and hold filter media 28. In one non-limiting exemplary embodiment, inner sleeve 26 has a neck portion 30 configured to be fluidly sealed to a complimentary feature of an item (e.g., engine) the housing is in fluid communication with.

Although, the Figures show a housing with three filters and filter cartridges, it is understood that exemplary embodiments are intended to cover a housing with a single filter cartridge or other combinations greater or less than those shown in the attached Figures.

In accordance with an exemplary embodiment, inner sleeve 26 is configured to have a neck portion 28 configured to be fluidly sealed and unsealed to an outlet opening of a flange (not shown) the filter housing is secured to or alternatively an outlet opening of the filter housing (not shown). In accordance with an exemplary embodiment, neck portion 28 has a length sufficient to define a gap 32 between a shield portion 34 of the inner sleeve and an inlet portion of the item comprising the filter housing, which includes the inlet openings for unfiltered fluid to be received by the filter assembly.

Depending away from shield portion 34 is a wall portion 36, which in an exemplary embodiment defines a fluid path 38 between an outer surface 40 of the wall portion and an inner surface 42 of the housing.

In accordance with an exemplary embodiment, wall portion 36 terminates with a plurality of tab portions 44, which define a plurality of openings 46 or fluid paths therethrough. In accordance with an exemplary embodiment, tabs 44 have features 48 configured to engage features 50 of cap 14. In this embodiment, the inner sleeve and the filter media is easily inserted and removed from the cap thus, the inner sleeve and filter media are replaceable and the cap is reused. In other words, the features of the inner sleeve and/or cap are deflectable to allow removal and replacement of the inner sleeve. In one embodiment, the neck portion of the inner sleeve has at least one O-ring to provide a means for sealing the outlet opening of the inner sleeve to the item having the fluid being filtered.

Figure 2:
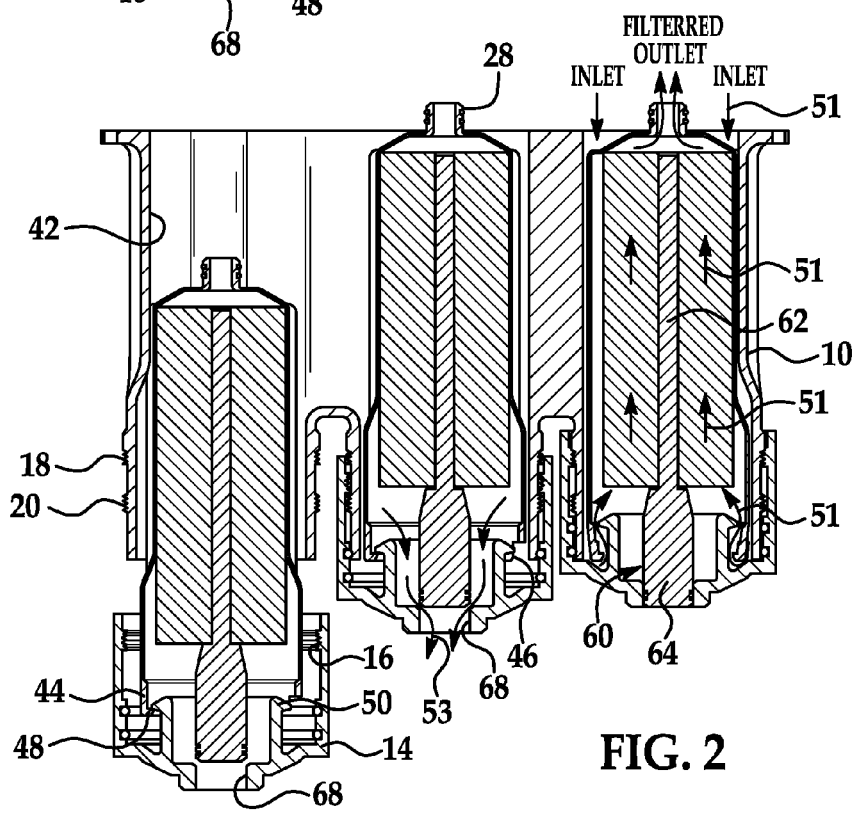
FIG. 2 is a cross-sectional view of an exemplary embodiment of the present invention illustrating various operational positions.
Figure 3:
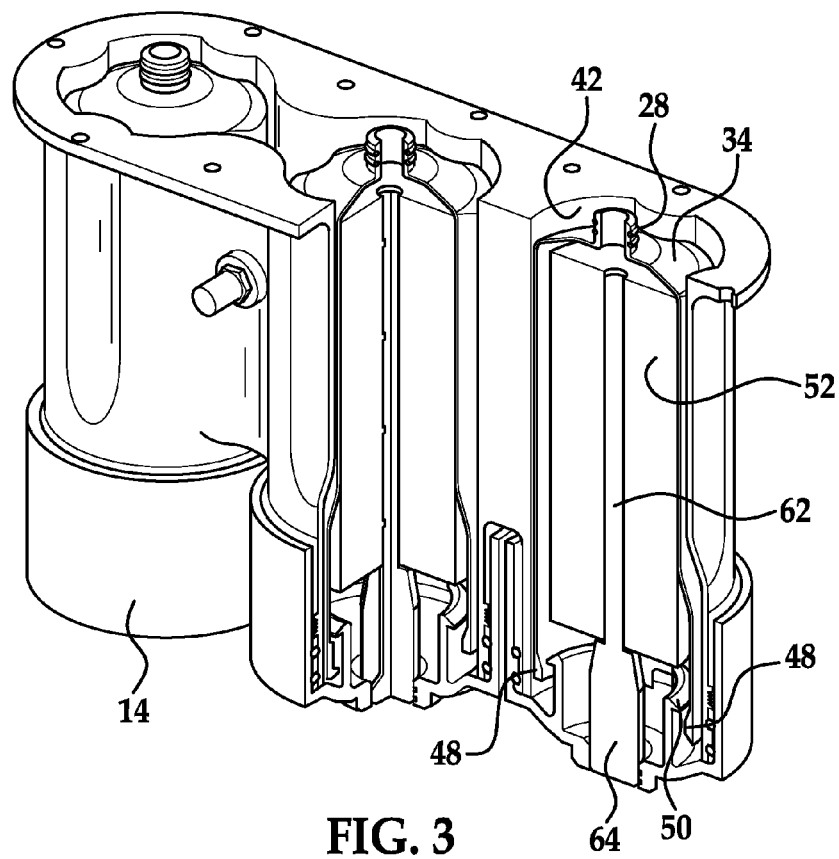
FIGS. 3-4 are partial perspective cross-sectional views of exemplary embodiments of the present invention.
Figure 4:
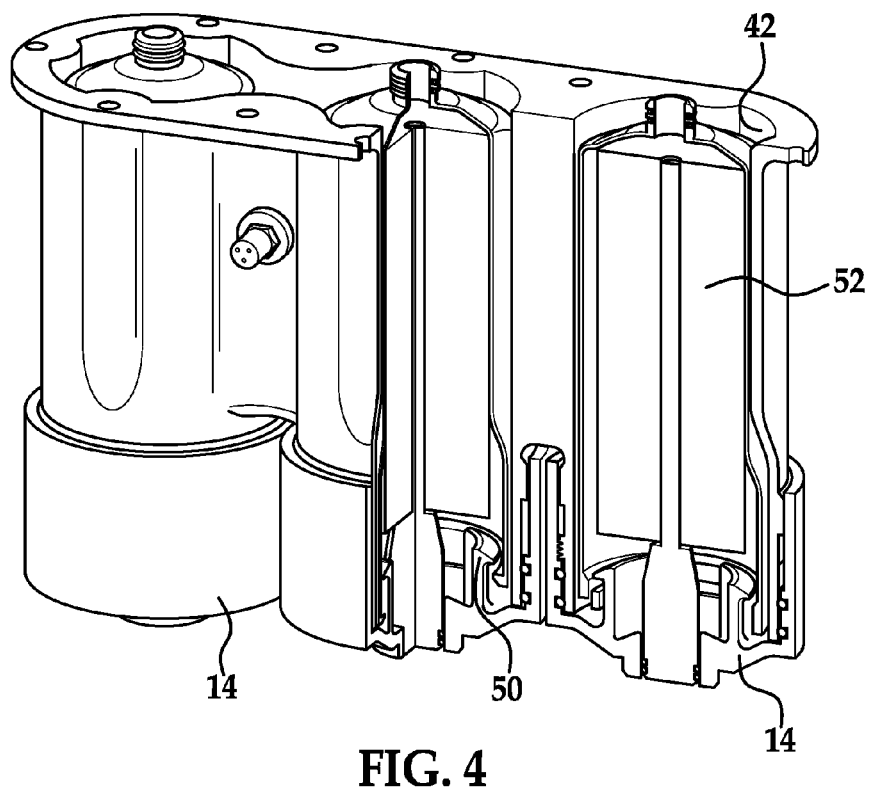
Figure 5:
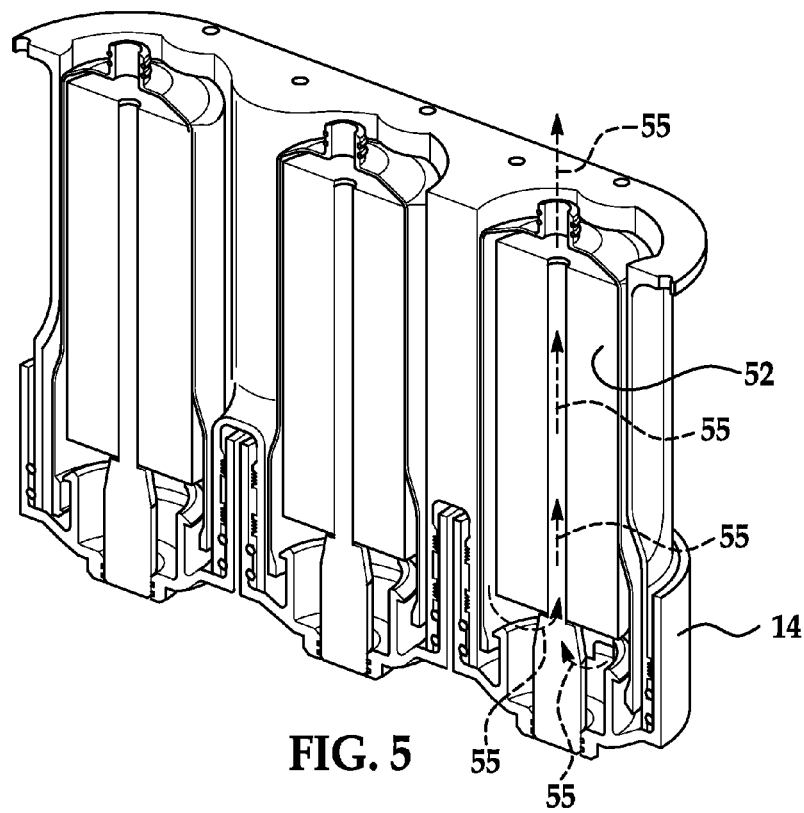
FIGS. 5-6 are perspective cross-sectional views of exemplary embodiments of the present invention.
Figure 6:
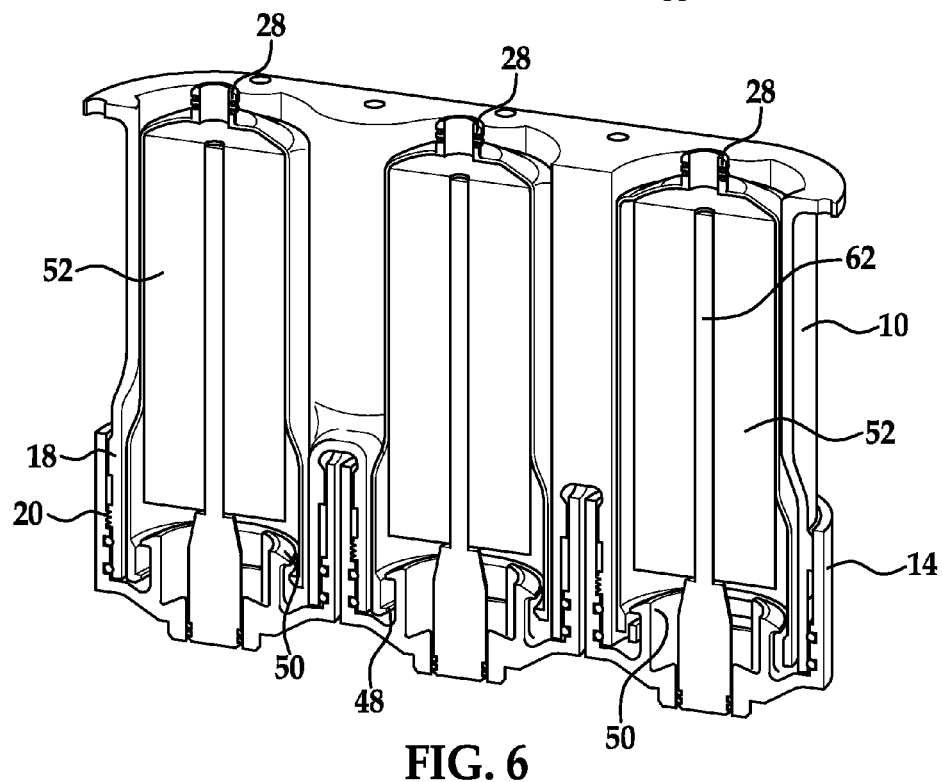
Figure 7:
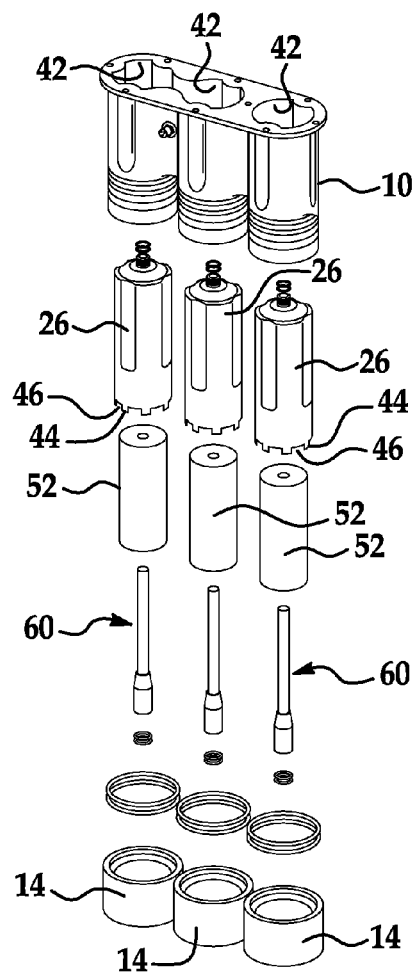
FIG. 7 is an exploded view of an exemplary embodiment of the present invention.
Figure 8:
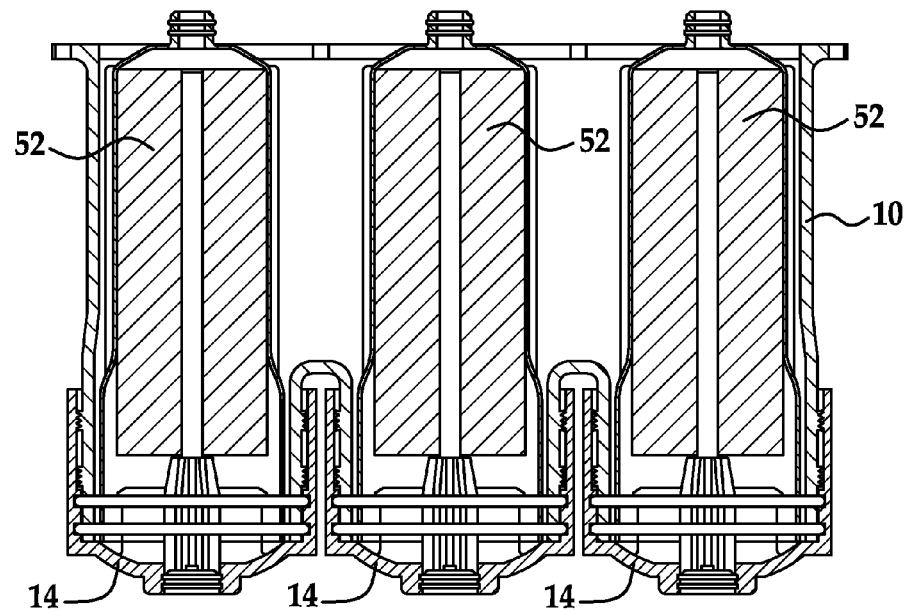
FIG. 8 is a cross-sectional view of an exemplary embodiment of the present invention.
Figure 9:
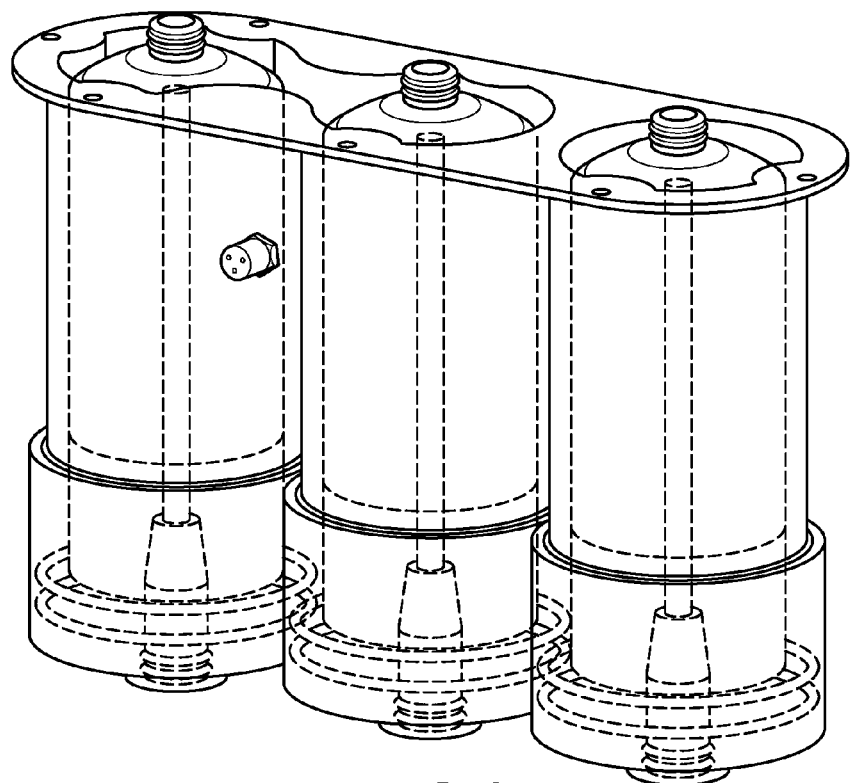
FIG. 9 is a perspective view of an exemplary embodiment of the present invention.
Figure 10:
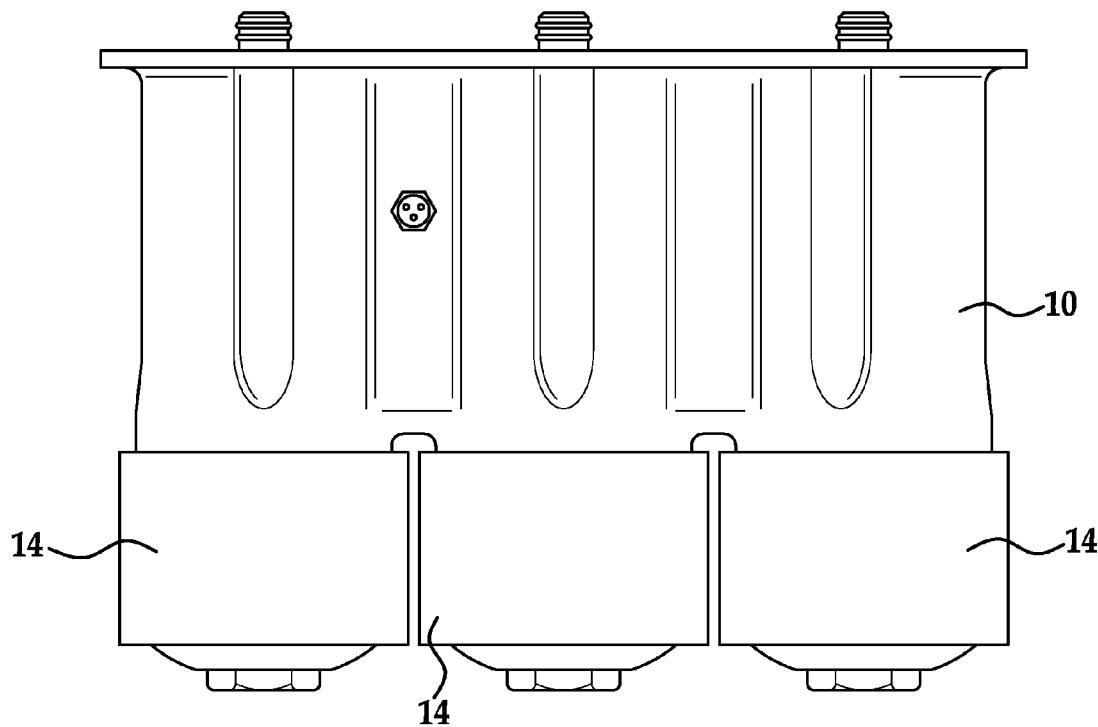
FIG. 10 is a side view of an exemplary embodiment of the present invention.

Accordingly and referring to the cap position depicted at the far right of FIG. 2 (e.g., closed position), a fluid path defined by the arrows 51 is provided. As shown, a fluid enters the filter through the inlet openings passes though gaps 32 and 38, through openings 46 and into a filter media 52 disposed within an inner area 54 defined by inner sleeve 36. Alternatively, openings 46 may not be required since the features of the cap are moved away from the features of the inner sleeve when the cap is in the closed position (e.g., fluid flow is provided around the inner sleeve and into the filtration media).

Accordingly, the inner sleeve defines an area for receipt of the filter media of the filter. In one non-limiting exemplary embodiment, the filter media is formed by the teachings of U.S. patent application Ser. No. 11/533,649 filed Sep. 20, 2006, the contents of which are incorporated herein by reference thereto.

In this embodiment, the media provides high contaminant capacity per packing volume available. In accordance with the teachings of the aforementioned patent application, a non-woven media is used to provide a top or first sheet that is formed into a corrugated layer, and then the first sheet is attached to another flat sheet of the non-woven media and then this two sheet layer is wrapped around itself, which provides a greater amount of media that can be fitted into a given packaging space thus giving greater filtering capacity of the media.

In one non-limiting exemplary embodiment the top sheet or first sheet containing the corrugations is formed to have the corrugations by a thermoforming process of a synthetic non-woven media. Alternatively, and if a cellulose based media is used, an embossing process could be used to form the corrugations and other means of sealing the two layers may be used other than sonic welding (e.g., adhesives, hot melt adhesives, etc.). Regardless of the material used and the process for forming the corrugations the corrugations would be formed prior to the attachment of the lower or second flat sheet of media. The forming of the corrugations should be tapered gradually to pinch down to a flat portion on one side of the sheet to enable the attachment by welding of the lower flat sheet. The two sheets can be bonded together on one edge using adhesive or in an exemplary embodiment a continuous sonic weld.

Once the two sheets are attached together forming a long continuous roll of paper the media can be wrapped around itself in a spiral pattern. During this wrapping process, a bead of adhesive will be applied on the edge opposite the flat edge of the two layers in order to secure the layers to each other as well as provide a sealing means in order to provide a plurality of fluid paths wherein fluid passing therethrough is filtered by the media. By having alternative ends of the corrugations on each subsequent layer sealed, a flow path is created which utilizes the entire media area. In accordance with an exemplary embodiment, the final shape of the media could be round, elliptical, oval or any number of the regular configurations. Here the channels are open on one side and closed on the other side thus, the media defines a plurality of longitudinal channels wherein a plurality of inlet openings are on one side and a plurality of outlet openings are on the other side thus, fluid traveling through the filter media must pass through at least one layer of filter media in order to travel from the inlet to the outlet. Of course, the media may be constructed through the use of other methods (e.g., cast molding and equivalents thereof). In addition, other types of media are contemplated for use with exemplary embodiments of the present invention, as long as the media filters fluid passing therethrough without adversely affecting fluid flow through the filter.

Located in the center or any other suitable location of the filter media or the cartridge comprising the filter media and the inner sleeve is a drain plug member 60. Drain plug member 60 has a stem portion 62 and a head portion 64. Head portion 64 is configured to engage a drain opening 68 in cap 14. In the "closed position" the head portion is configured to fluidly seal opening 68. This may be achieved by any suitable means including O-rings and perhaps a chamfering of opening 68. Also, noted is that in this position the features 50 of the cap are not engaging the features of the tabs of the inner sleeve. This allows for a drain feature, which will be discussed herein.

For example, and referring now to the "drain position" illustrated in the center of the FIG. 2, cap 14 is unscrewed so that the threads of the cap are between the threads 18 and 20 of the housing of may just be engaging threads 20. As shown, only the cap moves and the head portion remains stationary thus an opening is provided in the cap portion. Also, the neck portion of the inner sleeve is still engaged since there is a space between the features of the cap and the inner sleeve during the closed position however, the features of the tab members are just about to or make contact with the features 50 of the cap and head portion 64 no longer fluidly seals drain opening 68 thus, fluid drainage in the direction of arrows 53 is now provided. In other words the filter and filter housing is now in a drainage position.

In an exemplary embodiment, or as an alternative the honeycomb filter media (e.g., the media formed by the teachings of U.S. patent application Ser. No. 11/533,649) may be wrapped around stem portion 62 as the filter media is being formed thus, stem 62 provides a locating means for the honeycomb media to be wrapped around as well as a means for holding head portion 64 in the correct location.

In an alternative exemplary embodiment, the drain plug member may also be configured to have a bypass valve disposed therein thus if the filtration media becomes clogged and the fluid pressure increases the bypass valve can open. Flow through the bypass valve into the outlet opening of the filter is shown by the dashed arrows 55 in FIG. 5.

Finally, and to remove the filter cartridge from the housing the cap is completely unscrewed and the entire filter cartridge is removed. This is the open position illustrated on the left side of FIG. 2. Here cap 14 is unscrewed and features 50 engage the features 48 of the inner sleeve and pull the inner sleeve down. During this movement the neck portion is removed. Thereafter, the cap and the inner sleeve can be completely removed and inner sleeve 26 and filter media 52 can be replaced (e.g., removed from the cap). In yet another alternative exemplary embodiment media 52 is the only item removed and inner sleeve 26 and drain plug member 60 are reused with a new media as long as there will be sufficient retention with plug member 60 and media 52 so that the cap can translate to the drain position wherein the opening in the cap is unsealed. In yet another alternative, inner sleeve 26, media 52 and drain plug member 60 are completely replaced with a new assembly (e.g., inner sleeve, filtration media and plug member) and only cap 14 is reused.

Accordingly and in accordance with exemplary embodiments of the present invention the configuration of the cap, inner sleeve and drain plug member as well as the housing provide a filter assembly, wherein three distinct operational modes are provided (e.g., closed, drain position and removal). Exemplary embodiments of the present invention provide a means to house/contain filtration media and potentially eliminate other components used in typical filter designs. Exemplary embodiments of the present invention can be utilized in a number of filtration formats including spin on style and cartridge style filters.

The inner sleeve serves as a means with which to house/contain filtration media. The inner sleeve itself can be a machined, molded or formed from a material that will provide reasonable structural strength and ease of manufacture, one non-limiting example is a plastic (e.g., nylon 6-6).

Inside the inner sleeve filtration media can be housed/contained such that an effective seal is created between the clean and dirty side of the filtration media which will allow the fluid to flow through the media. This seal may be accomplished in a number of ways including adhesives disposed between the media and the inner sleeve, infrared (IR) type welds or other welds and over molding of the sleeve about the filtration media.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A filter, comprising:
a housing defining an inner cavity;
an inner sleeve disposed within the housing, the inner sleeve having portions in a spaced relationship with respect to an interior surface of the inner cavity;
a plurality of tab members extending away from the inner sleeve, the tab members being configured to be removably secured to a feature of a cap, the cap being configured to engage the housing to provide a first position and a second position with respect to the housing, wherein the first position seals the inner sleeve to the housing and a fluid filtration path from an inlet of the filter to an outlet of the filter is defined by the inner sleeve and the second position provides a fluid drain path through an opening in the cap, the fluid drain path being closed when the cap is in the first position; and
a filtration media disposed within an interior area of the inner sleeve, wherein the filtration media is disposed in the fluid filtration path and fluid flow through the outlet opening must pass through the filtration media, wherein the cap has a plurality of threads configured to threadingly engage a pair of threads positioned on a portion of housing, the pair of threads being separated from each other by a non-threaded space.

2. The filter as in claim 1, wherein the feature of the cap has a plurality of features each being configured to engage a respective one of the plurality of tab members of the inner sleeve.

3. The filter as in claim 1, wherein the tab members of the inner sleeve are deflectable to allow the cap to releasably engage the inner sleeve.

4. The filter as in claim 1, wherein the inner sleeve has a neck portion to provide fluid communication to the filtration media.

5. The filter as in claim 4, wherein the neck portion of the inner sleeve has at least one O-ring to provide a means for sealing an outlet opening of the inner sleeve to a source of fluid.

6. The filter as in claim 4, wherein the neck portion has a length sufficient to define a gap between a shield portion of the inner sleeve and an inlet portion of the housing.

7. The filter as in claim 1, wherein the inner sleeve has a wall portion depending away from a shield portion of the inner sleeve and the wall portion defines a fluid path between an outer surface of the wall portion and an inner surface of the housing.

8. The filter as in claim 1, wherein one of the pair of threads positioned on the portion of the housing are located on a distal end of the housing wherein the cap and the inner sleeve are capable of being completely removed from the housing.

9. The filter as in claim 1, further comprising a drain plug member located within the filtration media, the drain plug member having a stem portion and a head portion, the stem portion being secured to the filtration media and the head portion being configured to engage the opening in the cap when the cap is in the first position fluidly sealing the opening in the cap and the head portion no longer seals the opening when the cap is in the second position and the features of the cap is not engaging the plurality of tabs of the inner sleeve when the cap is in either the first and second positions.

10. The filter as in claim 1, wherein the plurality of threads of the cap threadingly engage one of the pair of threads of the housing when the cap is in the first position and the other one of the pair of threads of the housing when the cap is in a third position, wherein the plurality of threads of the cap being located at the non-threaded space when the cap is in the second position and the plurality of tab members of the inner sleeve contact the feature of the cap as the cap is translated from the second position towards the third position.

11. The filter as in claim 10, wherein the drain plug member also comprises a bypass valve disposed therein, the bypass valve providing a fluid path through the filtration media to the outlet of the filter.

12. A filter, comprising:
a housing defining a plurality of inner cavities;
a separate inner sleeve disposed in each of the inner cavities, each inner sleeve having portions in a spaced relationship with respect to the an interior surface of the inner cavity;
a plurality of tab members extending away from each inner sleeve, the tab members being configured to be removably secured to a feature of a separate cap for each inner sleeve, each cap being configured to be located in two discrete positions with respect to the housing to provide a first position and a second position, wherein the first position of each cap seals a respective inner sleeve to the housing and a fluid filtration path from an inlet of the filter to an outlet of the filter is defined by the inner sleeve and the second position of each cap provides a fluid drain path through an opening in the cap, the fluid drain path being closed when the cap is in the first position; and
a filtration media disposed within an interior area of each inner sleeve, wherein the filtration media is disposed in the fluid filtration path and fluid flow through the outlet opening must pass through the filtration media, wherein each cap has a plurality of threads configured to threadingly engage a first set of threads and a second set of threads positioned on a portion of housing, the first set of threads and the second set of threads being separated from each other by a non-threaded space.

13. The filter as in claim 12, wherein each inner sleeve has a neck portion to provide fluid communication to the filtration media and the neck portion has a length sufficient to define a gap between a shield portion of the inner sleeve and an inlet portion of the housing and the inner sleeve has a wall portion depending away from the shield portion of the inner sleeve and the wall portion defines a fluid path between an outer surface of the wall portion and an inner surface of the housing.

14. The filter as in claim 12, wherein the second set of threads are located on a distal end of the housing and wherein the cap and the inner sleeve are capable of being completely removed from the housing.

15. The filter as in claim 12, wherein the filtration media of each inner sleeve further comprises a drain plug member located within the filtration media, the drain plug member having a stem portion and a head portion, the stem portion being secured to the filtration media and the head portion being configured to engage the opening in cap when the cap is in the first position fluidly sealing the opening in the cap and the head portion no longer seals the opening when the cap is in the second position and the features of the cap are not engaging the plurality of tabs of the inner sleeve when the cap is in either the first and second positions.

16. The filter as in claim 15, wherein each cap threadingly engages the first set of threads when the cap is in the first position and the second set of threads when the cap is in a third position, the plurality of threads of the cap being located at the non-threaded space when the cap is in the second position and the plurality of tab members of the inner sleeve contact the feature of the cap as the cap is translated from the second position towards the third position.

17. A method for providing a drain path through a filter housing, comprising:
moving a cap from a first position to a second position with respect to the filter housing wherein an opening in the cap is unsealed as the cap moves from the first position to the second position, the cap becoming unsealed to provide the drain path therethrough as a head member is removed from the opening in the cap, the head member being secured to a filtration media disposed in the filter housing, the filtration media being disposed in an inner sleeve also disposed in the housing, the inner sleeve having a plurality of tab members extending away from the inner sleeve, the tab members being configured to be removably secured to a feature of the cap and the first position of the cap seals the inner sleeve to the filter housing and a fluid filtration path from an inlet of the filter housing to an outlet of the filter housing is defined by the inner sleeve, the fluid drain path being closed when the cap is in the first position, wherein the cap has a plurality of threads configured to threadingly engage a first set of threads of the filter housing when the cap is in the first position and a second set of threads positioned on a portion of housing, the first set of threads and the second set of threads being separated from each other by a non-threaded space.

18. The method as in claim 17, wherein the plurality of threads of the cap threadingly engage the second set of threads when the cap is in a third position, and the second set of threads being located on a distal end of the filter housing, the plurality of threads of the cap being located at the non-threaded space when the cap is in the second position and the plurality of tab members of the inner sleeve contact the feature of the cap as the cap is translated from the second position towards the third position.

* * * * *